United States Patent [19]

Matsumoto

[11] Patent Number: 4,532,178

[45] Date of Patent: Jul. 30, 1985

[54] MAGNETIC RECORDING MEDIA COMPRISING A MAGNETIC LAYER ON ONE SIDE OF A SUPPORT AND A NON-MAGNETIC TIO LAYER ON THE OTHER SIDE

[75] Inventor: Yukio Matsumoto, Mito, Japan

[73] Assignee: Victor Company of Japan, Ltd., Japan

[21] Appl. No.: 517,713

[22] Filed: Jul. 27, 1983

[30] Foreign Application Priority Data

Jul. 29, 1982 [JP] Japan ................................ 57-131154

[51] Int. Cl.$^3$ ................................................ G11B 5/72
[52] U.S. Cl. .................................... 428/328; 360/134; 360/135; 360/136; 427/131; 427/128; 428/694; 428/900
[58] Field of Search ............... 427/131, 128; 428/694, 428/900, 329, 695, 480, 483; 232/62.54, 62.55; 360/134-136

[56] References Cited

U.S. PATENT DOCUMENTS

| | | | |
|---|---|---|---|
| 3,617,378 | 9/1969 | Beck .................................... | 427/131 |
| 4,117,190 | 9/1978 | Akashi et al. ...................... | 428/325 |
| 4,328,935 | 5/1982 | Steel .................................... | 427/131 |
| 4,420,408 | 12/1983 | Kujimoto ........................... | 428/329 |
| 4,423,452 | 12/1983 | Kajimoto et al. .................. | 427/132 |
| 4,476,177 | 10/1984 | Mizuno .............................. | 428/206 |

FOREIGN PATENT DOCUMENTS

| | | |
|---|---|---|
| 2522780 | 12/1975 | Fed. Rep. of Germany . |
| 2022780 | 12/1975 | Fed. Rep. of Germany . |
| 54-34602 | 10/1979 | Japan .................................. 428/900 |
| 55-1651 | 1/1980 | Japan .................................. 428/695 |
| 1522505 | 8/1978 | United Kingdom ............... 427/131 |

*Primary Examiner*—Ellis P. Robinson
*Attorney, Agent, or Firm*—Lowe, King, Price & Becker

[57] ABSTRACT

Magnetic recording media which comprise a support, a magnetic recording layer on one side of the support, and a non-magnetic layer comprising TiO on the other side are described. The non-magnetic layer is made of a dispersion of TiO particles in a resin binder or is a continuous vacuum-deposited TiO layer.

6 Claims, No Drawings

MAGNETIC RECORDING MEDIA COMPRISING A MAGNETIC LAYER ON ONE SIDE OF A SUPPORT AND A NON-MAGNETIC TIO LAYER ON THE OTHER SIDE

BACKGROUND OF THE INVENTION

1. Field of the Invention

This invention relates to magnetic recording media having improved properties such as durability, travelling stability and electromagnetic conversion characteristics. The term "magnetic recording media" used herein is intended to mean video tapes, audio tapes, magnetic recording discs, and similar magnetic recording media.

2. Description of the Prior Art

Magnetic recording media generally comprise a base and a magnetic recording layer formed on one side of the base. In order to enable the magnetic recording media to stably travel during recording and reproducing operations, prior art media have been made in which a magnetic layer is formed on one side of a base and is roughened to the opposite side of the base or coated with a mixture of $CaCO_3$ and a binder to form a $CaCO_3$ layer on the opposite side.

However, roughening the base on the side opposite to the magnetic layer tends to leave the magnetic layer surface roughened as well, so that electromagnetic conversion characteristics of the resulting recording medium become poor. On the other hand, the magnetic recording medium which is formed with a $CaCO_3$ layer on the opposite side thereof in order to ensure its travelling stability has the following disadvantages. Although stably travelled at the initial stage of recording and reproducing operations, the medium deteriorates after travelling several hundred cycles of operation due to the fact that the $CaCO_3$ layer is scraped off during the travelling operations with its coefficient of friction increasing. Thus, the effect of $CaCO_3$ on the travelling stability lowers considerably, causing the travelling performance of the medium to deteriorate.

SUMMARY OF THE INVENTION

It is accordingly an object of the present invention to provide magnetic recording media which have much improved durability on the non-magnetic layer side.

It is another object of the invention to provide magnetic recording media which can be stably travelled during recording and reproducing operations over a long term.

It is a further object of the invention to provide magnetic recording media which have a magnetic layer on one side thereof and a non-magnetic TiO-base layer on the opposite side.

It is a still further object of the invention to provide magnetic recording tapes which have an excellent light-shielding property by which, when a magnetic recording tape is detected by transmission of light through a transparent tape end, no malfunction takes place upon the detection.

The above objects can be achieved, according to the present invention, by magnetic recording media which comprise a support, a magnetic recording layer formed on one side of the support, and a non-magnetic layer formed on the other side of the support and comprising TiO. The non-magnetic layer may be made of a dispersion of TiO particles in a resin binder. Alternatively, the non-magnetic layer may be made of vacuum-deposited TiO. In particular, when the dispersion of TiO particles in a resin binder is used, carbon black may be added up to about 70% by weight of the TiO used, by which the light transmittance of the medium can be remarkably improved.

DETAILED DESCRIPTION AND PREFERRED EMBODIMENTS OF THE INVENTION

The magnetic recording media of the present invention have a magnetic recording layer on one side of a support and a non-magnetic layer on the other side. The recording layer is made of magnetic particles dispersed throughout a resin binder.

The magnetic recording layer is not of a specific type but may be of any known type. For instance, magnetic particles may be made of conventional magnetic materials which are properly used depending on the type of recording medium. This is true of binders dispersing the magnetic particles therein. Hence, the magnetic materials and binders for use in the magnetic recording media of the invention are briefly described.

Useful magnetic materials include, for example, ferromagnetic iron oxides such as gamma-$Fe_2O_3$ and $Fe_3O_4$ with or without additional metals such as Co, Ni, Mn and the like, ferromagnetic metals such as Fe, Co, Ni and the like, and alloys thereof. These metals or alloys may include additional metals such as Al, Cr, Mn, Cu and the like. Other ferromagnetic materials such as $CrO_2$ may also be used.

Binders for these magnetic materials may be any known thermoplastic resins, thermosetting resins, and mixtures thereof. Typical examples of the thermoplastic resins include vinyl chloride-vinyl acetate copolymers, vinyl chloride-vinylidene chloride copolymers, acrylic esterstyrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate-vinyl alcohol terpolymers, and various other synthetic rubber resins. Examples of the thermosetting resins include phenolic resins, epoxy resins, alkyd resins, silicone resins, urea-formaldehyde resins, mixtures of isocyanates and polyols, and the like resins. These binder resins, both thermoplastic and thermosetting, may be used singly or in combination.

In practice, magnetic materials are dispersed in resin binders dissolved in solvents. The resulting dispersion is applied onto a support and cured to form a magnetic layer on the support as usual. Typical solvents for binders are alcohols such as methanol, ethanol, and the like, aromatic compounds such as xylene, toluene, benzene and the like, ketones such as acetone, methyl ethyl ketone, methyl isobutyl ketone and the like, and mixtures thereof. As a matter of course, the dispersion may further comprise any known additives such as dispersants, lubricants, abrasive agents, anti-static agents, surfactants and the like as is well known in the art.

Suitable supports include, for example, films, foils, sheets of a variety of materials. Typical materials include synthetic or semi-synthetic resins such as polyesters, polyolefins, cellulose derivatives, and the like, metals such as aluminium, copper and the like, glasses or ceramics. Of these, synthetic resins including polyesters are preferably used.

In accordance with the present invention, the recording medium having a magnetic recording layer on one side thereof should have a non-magnetic TiO-base layer on the other side. The TiO-base layer is formed, for example, by coating a dispersion of TiO particles in a binder dissolved in a solvent to the support on the other side thereof, followed by drying and curing under suitable conditions of 30° C. to 100° C. The dried layer has usually a thickness of 0.05 to 10 microns, preferably 0.1 to 5 microns. The TiO particles useful for the above purposes have generally an average size of from 0.01 micron to about 5 microns, preferably below about 1 micron.

The thus obtained recording medium having the TiO-base layer exhibits a small coefficient of friction and can thus be stably travelled even after a great number of repeated travelling cycles. In addition, such recording medium has a good S/N ratio and a small light transmittance. This small light transmittance is very advantageous when the recording medium in the form of a tape is applied to a recording and reproducing apparatus of the type which has a mechanism for detecting a transparent tape end by a photosensor. This is because the TiO layer which is formed on the opposite side of the magnetic layer is so small in light transmittance that the tape end detector mechanism can work without malfunction.

The binders useful in dispersing the TiO particles may be those described with respect to the magnetic recording layer. Synthetic copolymers typical of which are vinyl chloride-vinyl acetate copolymers are preferably used. This type of non-magnetic layer is usually made of a composition comprising 10 to 80 wt% of a binder and correspondingly 90 to 20 wt% of TiO particles dispersed in the binder. As a matter of course, the composition may further comprise various additives similar to those mentioned with respect to the magnetic layer.

In order to further improve particularly the light-shielding property and the S/N ratio, carbon black is added to the dispersion of TiO particles in a binder. Carbon black is added in an amount of up to 70 wt% of the TiO used and has an average size similar to TiO particles. It will be noted that both average sizes of TiO and carbon black particles should preferably be below a thickness of the TiO layer formed in order to prevent an undesirable abrasion loss of recording heads and other metal parts of a recording and reproducing apparatus. If, for example, the TiO layer is formed to have a thickness of about 2 microns, TiO and carbon black particles should preferably be below 2 microns.

In the above embodiment, the TiO layer is formed of a dispersion of TiO particles in a binder but it may be formed by vacuum depositing a continuous layer of TiO on a support by any known technique. In this case, the TiO layer which is made of TiO alone has generally a thickness of 0.02 to 10 microns, by which similar excellent characteristics are obtained.

The present invention is particularly described by way of examples.

EXAMPLE 1

A mixture of 400 parts by weight of gamma-$Fe_2O_3$, 100 parts by weight of polyurethane, 40 parts by weight of vinyl chloride-vinyl acetate copolymer, 4 parts by weight of yolk lecithin, 600 parts by weight of methyl ethyl ketone, and 600 parts by weight of toluene was mixed in a sand mill for 20 hours, thereby obtaining a magnetic paint. This paint was applied onto a polyester film on one surface thereof, followed by drying, calendering and curing to form a magnetic layer having a thickness of 5.5 microns.

Mixtures of 10 parts by weight of vinyl chloride-vinyl acetate copolymer, 10 parts by weight of polyurethane, 80 parts by weight of TiO particles with different sizes, 250 parts by weight of methyl ethyl ketone, and 250 parts by weight of toluene with or without addition of up to 70 wt%, based on the TiO particles, of carbon black particles having different average sizes were sufficiently mixed in a sand mill. Each mixture was applied onto the polyester film on the side opposite to the magnetic layer-bearing side, followed by drying, calendering and curing at 45° C. to obtain an about 1 micron thick TiO-base layer.

The thus obtained recording media which had a magnetic layer on one side and a non-magnetic TiO-base layer on the other side were subjected to measurements of an S/N ratio, coefficient of friction after 200 cycles of reproduction operation, and light transmittance. It will be noted that the S/N ratio was measured by recording and reproducing a signal of 4 MHz and expressed as a relative value based on the S/N ratio of a reference magnetic medium and that the light transmittance was measured using light having a wavelength of 9000 Å. The results are shown in the Table below.

TABLE

| Sample No. | Average Size of TiO (microns) | Carbon Black Average Size (microns) | Carbon Black Amount Based on TiO (wt %) | S/N Ratio (dB) | Coefficient of Friction | Light Transmittance (%) |
| --- | --- | --- | --- | --- | --- | --- |
| 1 | 0.01 | — | 0 | 1.7 | 0.257 | 0.17 |
| 2 | 0.50 | — | 0 | 1.4 | 0.213 | 0.19 |
| 3 | 1.00 | — | 0 | 1.5 | 0.198 | 0.19 |
| 4 | 1.50 | — | 0 | 0.9 | 0.204 | 0.23 |
| 5 | 0.50 | 0.01 | 30 | 1.4 | 0.233 | 0.13 |
| 6 | 0.50 | 0.01 | 50 | 1.6 | 0.204 | 0.06 |
| 7 | 0.50 | 0.01 | 70 | 1.7 | 0.242 | 0.03 |
| 8 | 0.50 | 0.5 | 50 | 1.5 | 0.211 | 0.07 |
| 9 | 0.50 | 1.0 | 50 | 1.4 | 0.229 | 0.10 |
| 10 | 0.50 | 1.5 | 50 | 0.8 | 0.231 | 0.10 |
| 11 | 0.50 | 1.5 | 30 | 0.9 | 0.215 | 0.16 |
| 12 | 0.50 | 0.01 | 90 | 1.6 | 0.305 | 0.01 |
| 13 | 0.005 | — | 0 | 1.4 | 0.321 | 0.12 |
| 14 | nil | — | nil | 0.5 | 0.380 | 0.53 |

As will be apparent from the above results, the magnetic recording media having the non-magnetic layer of TiO particles having an average size of about 1 micron or below exhibited a small coefficient of friction, good S/N ratio, and small light transmittance. It was found that when the layer thickness was increased to about 5 microns, similar results were obtained using TiO particles having an average size of 5 microns. This was true of carbon black. The content of carbon black over 70% is disadvantageous because the friction coefficient becomes poorer.

EXAMPLE 2

The general procedure of Example 1 was repeated except that TiO was deposited on the opposite side of the support under a vacuum of $10^{-4}$ mmHg in a thickness of 0.5 micron. The magnetic recording medium was measured in the same manner as in Example 1. As a result, the results are similar to those of Sample No. 3 of Example 1.

What is claimed is:

1. A magnetic recording medium which comprises a support, a magnetic recording layer formed on one side of said support, and a non-magnetic layer formed on the other side of said support, wherein said non-magnetic layer comprises TiO.

2. A magnetic recording medium according to claim 1, wherein said non-magnetic layer is made of a dispersion of TiO particles having an average size ranging from 0.01 to 5 microns in a resin binder.

3. A magnetic recording medium according to claim 2, wherein said dispersion comprises 20 to 90 wt% of said TiO particles and correspondingly 80 to 10 wt% of said resin binder.

4. A magnetic recording medium according to claim 2, wherein said TiO particles have an average size smaller than a thickness of said non-magnetic layer.

5. A magnetic recording medium according to claim 2, further comprising up to 70 wt% of carbon black based on the TiO particles used.

6. A magnetic recording medium according to claim 1, wherein said non-magnetic layer is a continuous vacuum-deposited TiO layer.

* * * * *